United States Patent
Gryspeerdt et al.

(10) Patent No.: US 6,863,605 B2
(45) Date of Patent: Mar. 8, 2005

(54) COMBINE HARVESTER WITH PIVOTING DEFLECTOR PLATE

(75) Inventors: Jose Gryspeerdt, Poesele (BE); Edward H. Priepke, Lancaster, PA (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/787,808

(22) Filed: Feb. 26, 2004

(65) Prior Publication Data

US 2004/0176151 A1 Sep. 9, 2004

(30) Foreign Application Priority Data

Mar. 7, 2003 (GB) .............................. 0305253

(51) Int. Cl.⁷ .............................................. A01F 12/40
(52) U.S. Cl. ...................................................... 460/111
(58) Field of Search ............................ 460/119, 111, 460/112

(56) References Cited

U.S. PATENT DOCUMENTS

| | | | | |
|---|---|---|---|---|
| 3,712,309 A | * | 1/1973 | Schmitz ..................... 460/112 |
| 4,056,107 A | * | 11/1977 | Todd et al. ................... 460/112 |
| 4,637,406 A | * | 1/1987 | Guinn et al. ................. 460/112 |
| 4,913,679 A | * | 4/1990 | Bender ........................ 460/112 |
| 6,547,169 B1 | | 4/2003 | Matousek et al. |
| 6,656,038 B1 | * | 12/2003 | Persson ....................... 460/112 |
| 2003/0114207 A1 | * | 6/2003 | Wolters et al. .............. 460/111 |
| 2004/0029624 A1 | * | 2/2004 | Weichholdt ................. 460/112 |
| 2004/0092298 A1 | * | 5/2004 | Holmen ....................... 460/111 |

FOREIGN PATENT DOCUMENTS

| | | | |
|---|---|---|---|
| EP | 0 357 090 | * | 9/1989 |
| EP | 0727135 A1 | | 8/1996 |
| WO | WO 01/01754 A1 | | 1/2001 |

* cited by examiner

Primary Examiner—Robert E. Pezzuto
Assistant Examiner—Nathan Mammen
(74) Attorney, Agent, or Firm—Brant T. Maurer; Rebecca Henkel

(57) ABSTRACT

A combine harvester has at its rear end a crop residue chopper and a deflector plate for defining the path followed by the crop residue discharged from the rear end of the combine harvester. The deflector plate has a first position to direct the crop residue into the chopper and a second position to direct the crop residue forward of the chopper. In the invention, the deflector plate also has a third position in which the crop residue is directed to flow over the top and to the rear of the chopper.

10 Claims, 3 Drawing Sheets

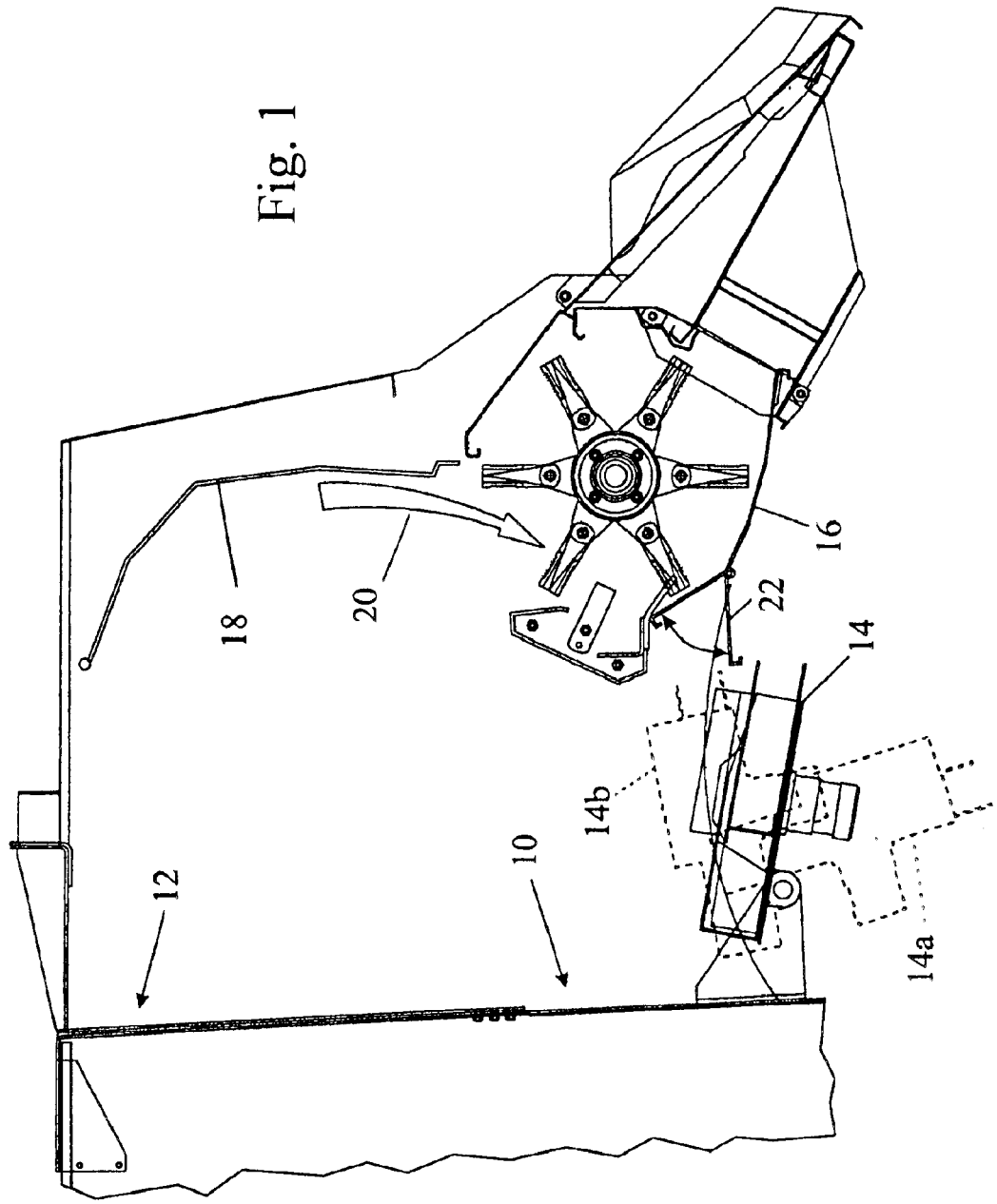

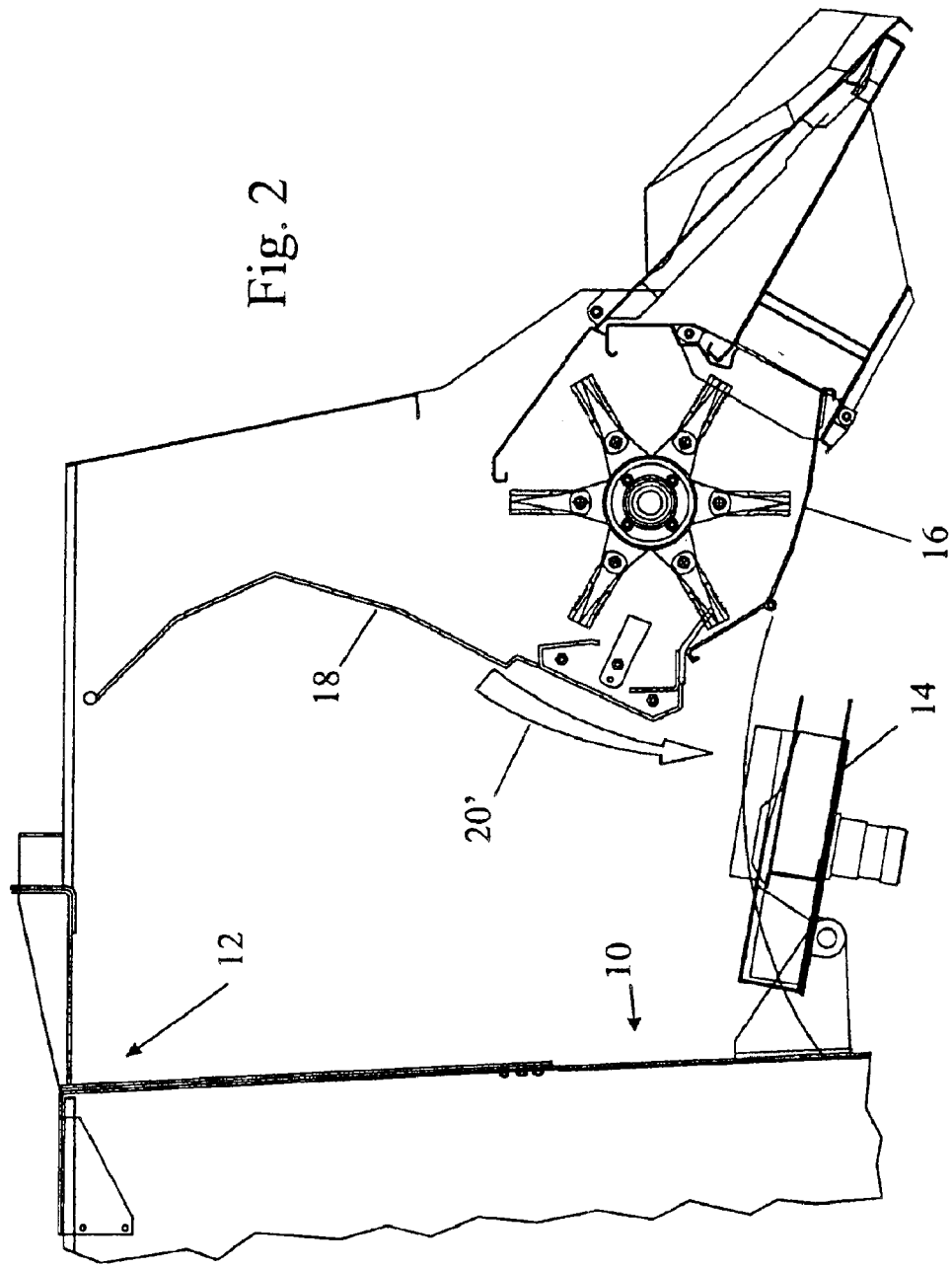

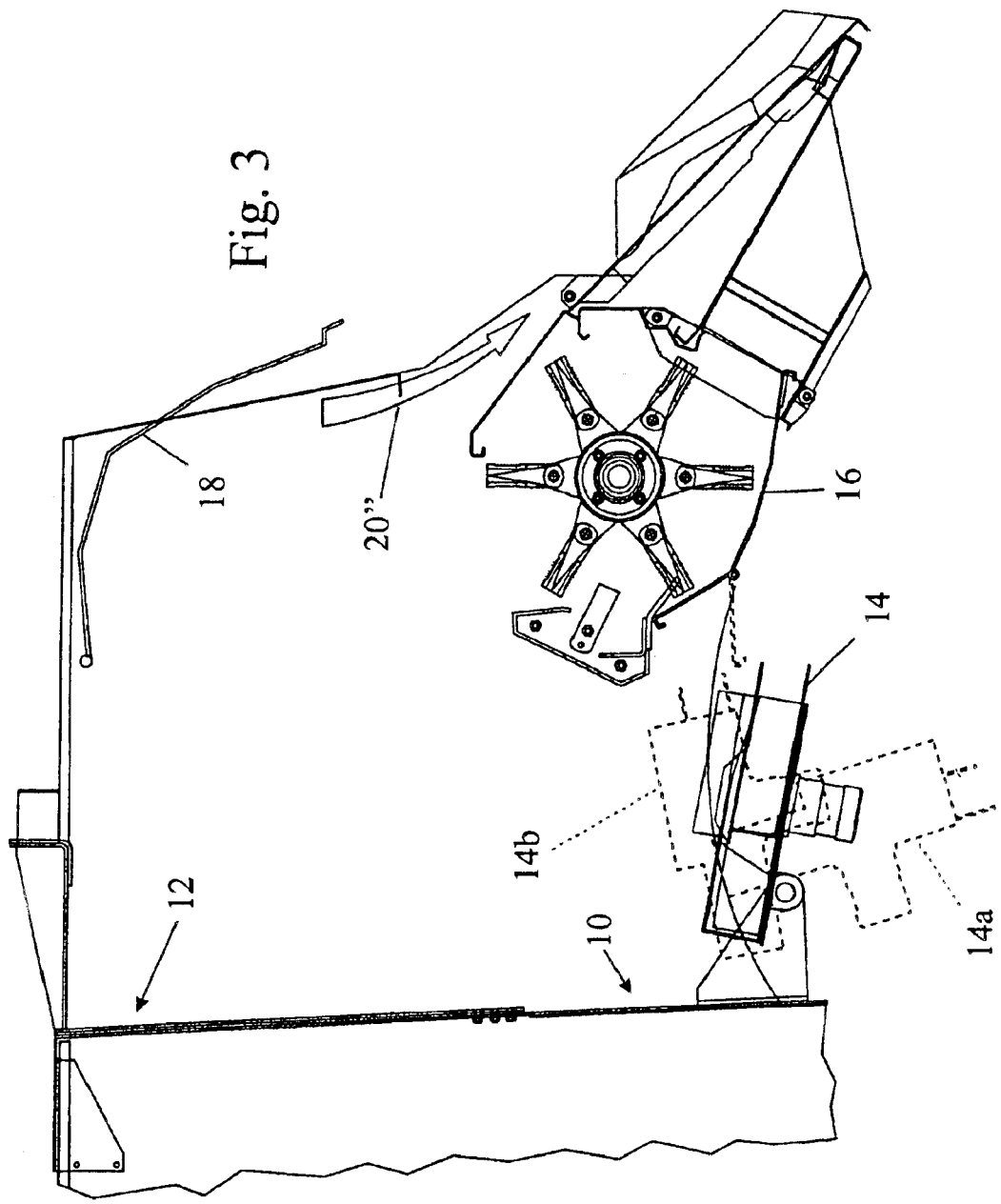

COMBINE HARVESTER WITH PIVOTING DEFLECTOR PLATE

CROSS REFERENCE TO RELATED PATENT APPLICATIONS

Priority is hereby claimed under 35 U.S.C. 119 to Great Britain Patent Application GB 0305253.7, titled "Combine Harvester", filed Mar. 7, 2003, and having Jose Gryspeerdt and Edward H. Priepke as inventors.

BACKGROUND OF THE INVENTION

The present invention relates to a combine harvester.

After a crop has been cut from a field by a combine harvester, it is processed by a threshing mechanism, beaters, shakers and a sieve unit to separate the grain from the remainder, which is made up of crop residue and chaff. The type of crop residue will depend on the nature of the crop being harvested, and the term is used herein to include such larger items as straw, stalks, corn cobs and other thick plant parts. The chaff on the other hand is much finer and includes such items as husks.

It is well known, for example from WO01/01754, for the crop residue and the chaff to be discharged separately from the rear of the combine harvester and to be processed differently, the crop residue being discharged from shakers that are positioned above and to the rear of the sieving unit from which the chaff is discharged.

As explained in the introduction of WO01/01754, modern combine harvesters are becoming ever larger with cutting tables which are significantly wider than the width of the harvester proper. For various reasons, amongst them the risk of fire resulting from the heat generated by such large combine harvesters, it is important to be able to disperse the crop residue and the chaff as far sideways and backwards as possible from the combine harvester.

A chaff discharging device provided at the discharge end of the sieving unit conventionally comprises a blower that can disperse the chaff sideways and rearwards over a large area. To disperse the crop residue, on the other hand, a chopper is provided behind the chaff discharging device to receive and process the material discharged from the shakers. The chopper cuts the crop residue into small pieces which are then dispersed to the side and rear of the harvester. The area over which the crop residue and the chaff are dispersed is preferably as wide as the cutting table so that they can later both be ploughed back uniformly into the soil.

It is sometimes preferred not to cut the crop residue in the chopper but instead to lay strings or swaths behind the combine harvester for later collection. This could be done for example with straw so that the straw may later be massed into bales or it may be done with corn cobs to avoid damaging the cutting blades of the chopper.

It is therefore known to provide a deflector at the inlet of the chopper that can be set to one of two positions. In the first position, the inlet of the chopper is uncovered and the crop residue flows into the mouth of the chopper so that it may be chopped and dispersed as earlier described. In the second position, the deflector covers the mouth of the chopper so that instead of entering into the chopper, the crop residue falls to the ground in the gap between the chaff discharging device and the chopper forming a swath behind the combine harvester.

It has also been proposed in U.S. Pat. No. 6,547,169, assigned to CNH America LLC and titled "Crop Residue Spreader for an Agricultural Combine", to disperse the chaff using a spreader rather than a blower, the spreader being designed to be capable of spreading the crop residue as well as the chaff. With the deflector positioned to prevent the crop residue from entering the chopper, the spreader can be set in either of two positions. In the first position, it allows the crop residue to fall to the ground to form a swath while in the second position it lies in the path of the crop residue so that the chaff and the uncut crop residue are together dispersed to the side and rear of the combine harvester.

In a combine harvester where the gap between the chopper and the chaff discharging device is restricted, it is known for that gap to become blocked with crop residue because of the rate at which the bulky crop residue is discharged through it. This problem is aggravated if the chaff discharging device is brought nearer to the chopper, as occurs in the harvester described in the above mentioned U.S. patent, and when the cutting table is made wider, as is the trend in modern combine harvesters.

SUMMARY OF THE INVENTION

With a view to mitigating the foregoing problem, the present invention provides a combine harvester having at its rear end a crop residue chopper and a deflector plate for defining the path followed by the crop residue discharged from the rear end of the combine harvester, the deflector plate having a first position to direct the crop residue into the chopper and a second position to direct the crop residue forward of the chopper, characterised in that the deflector plate has a third position in which the crop residue is directed to flow over the top and to the rear of the chopper.

Such terms as "rear" and "forward" as used herein are all referenced to the normal direction of travel of the combine harvester.

By directing the crop residue to flow over the top of the chopper, the invention avoids the risk of any build up of crop residue in the gap between the chopper and the rear of the combine harvester.

A further advantage of the invention is that it allows the crop residue to be laid in a string or swath independently of the position of the chaff discharging device. Thus, while the crop residue is being laid down in a swath the operator has the choice of doing the same with the chaff or using the chaff discharging device to spread the chaff over a wider area.

DESCRIPTION OF THE DRAWINGS

The invention will now be described further, by way of example, with reference to the accompanying drawings, in which:

FIG. 1 is a schematic representation of the rear of a combine harvester of the invention, showing the deflector plate positioned to direct the crop residue into the chopper and three alternative positions of the chaff discharging device;

FIG. 2 is a similar view to that of FIG. 1 showing the deflector plate positioned to direct the crop residue forward of the chopper and the chaff discharging device positioned to spread the uncut crop residue; and FIG. 3 is a further view similar to that of FIG. 1 showing the deflector plate in its position for directing the flow of crop residue over the top of the chopper and three alternative positions of the chaff discharging device.

DETAILED DESCRIPTIONS OF THE PREFERRED EMBODIMENTS

Combine harvesters are of course generally well known per se and one need not therefore be described herein in any great detail. Instead reference may be made for example to the above mentioned WO01/01754 which shows a combine harvester in its first figure and the second figure of which corresponds to the parts of the combine harvester shown in the accompanying drawings. It suffices for the purposes of the present invention to know that the various threshers, beaters, shakers and sieves within the combine harvester separate the grain, the chaff and the crop residue from one another. The chaff and the crop residue are discharged separately from the rear end of the combine harvester, the chaff discharge opening being designated 10 in the accompanying drawings and being disposed beneath the crop residue discharge opening 12.

A discharge device 14 is mounted below the chaff discharge opening 10. The discharge device 14 is constructed as a spreader which can be used to spread either the chaff alone or the chaff and uncut crop residue over an area as wide as the cutting table of the combine harvester. The spreader is not herein described in detail as it is in itself known. The spreader may be constructed, for example, in the manner described in WO01/01754, wherein the spreader comprises two tables with up-standing blades rotatable in opposite senses and surrounded by arcuate deflectors. Material fed on to the tables is spun around by the rotating tables and flung laterally and rearwards.

A chopper 16 is mounted to the rear of the chaff spreader 14. Once again, the chopper is itself well known and need not the described in detail within the present context. The crop residue is cut by the interaction of stationary and rotating blades and is then spread laterally and rearwards.

A deflector plate 18 is pivotably mounted above on the rear of the combine harvester to guide the flow of crop residue exiting from the rear of the combine harvester.

In the position of the deflector plate 18 shown in FIG. 1, the crop residue follows the path represented by the arrow 20 into the mouth of the chopper 18. The crop residue in this position thus passes through the chopper and is cut and dispersed over the ground.

With the deflector plate 18 in the position illustrated in FIG. 1, the chaff spreader 14 can adopt one of three positions. In the position shown in solid lines in FIG. 1, the chaff is spread by the spreader 14 so that both the chaff and the chopped crop residue are dispersed over a wide area. The spreader can however also be lowered into the position shown in dotted lines and designated 14a in which the chaff does not pass through the spreader 14 but falls to the ground in a string. In this second position, the spreader does not obstruct the discharge opening 10 and therefore allows access to the sieves within the combine harvester for maintenance purposes.

In a third position of the spreader 14, shown in dotted lines and designated 14b in FIG. 1, the spreader is arranged to direct the chaff into a separate dedicated intake opening of the chopper 16 which is covered by a pivotable flap 22. When the spreader is in its position designated 14b, the flap is lowered and the chaff is blasted into the chopper 20 separately from the crop residue. In this way, the chaff is used to assist in propelling the chopped crop residue to spread it over a wider area and also to prevent the crop residue from building up in any part of the chopper.

There are occasions when it is desired to spread the crop residue but not to chop it because doing so would damage the cutting blades of the chopper 16. This is achieved by moving the deflector plate 18 and the spreader 14 to their positions shown in FIG. 2. The deflector plate 18 in this position, prevents the crop residue from entering into the chopper 16 and instead the crop residue follows the path represented by the arrow 20' to pass forward of the chopper 16 on to the spreader 14. The spreader 14 will then spread the chaff and the uncut crop residue together over a wide area.

It would be possible with the deflector 18 in the position shown in FIG. 2 to pivot the spreader to the position designated 14a in FIG. 1. This should result in the crop residue and the chaff being deposited together in a string as proposed in FIG. 6 of WO01/01754. In practice however, the crop residue can build up and create a blockage in the space forward of the chopper 16.

To avoid this problem, the deflector 18 has a third position, shown in FIG. 3, in which the crop residue is directed to flow over the top of the chopper 16 to fall as a string or swath behind the combine harvester. No special steps need be taken to prevent the crop residue from entering the chopper 16 as most, if not all, of the crop residue will naturally follow the path represented by the arrow 20".

Once again, in this position of the deflector plate 18, the chaff spreader can adopt any of the three positions previously described. Namely, in the position shown in solid lines, the chaff will be dispersed over a wide area while the crop residue is laid down as a string, in the position designated 14a both the chaff and the crop residue will be deposited as strings and in the position designated 14b the chaff from the spreader will pass through the chopper 16 to clean the chopper and assist in dispersing any crop residue that does enter into its mouth.

What is claimed is:

1. A combine harvester having at its rear end a crop residue chopper and a rear opening above the chopper, comprising a single deflector plate having an upper end pivotally mounted above the chopper for defining a path followed by crop residue discharged from the rear end of the combine harvester, the deflector plate having a first position enclosing the rear opening to direct the crop residue into the choppers, a second position enclosing the rear to direct the crop residue forward of the chopper, and a third position to direct the crop residue beneath the deflector plate and over the chopper through the rear opening.

2. A combine harvester as claimed in claim 1, further comprising a spreader operative in one position to spread both chaff and uncut crop residue that has been directed by the deflector plate to pass forward of the chopper.

3. A combine harvester as claimed in claim 2, wherein the spreader has a second position in which it spreads neither the chaff nor any crop residue directed to pass forward of the chopper.

4. A deflector plate for an open rear end of a combine harvester including a crop residue chopper in a lower region thereof, the chopper having an upper portion including an upwardly facing inlet opening, the deflector plate comprising:

an upper portion pivotally mounted in an upper region of the rear end of the harvester such that the deflector plate extends downwardly therefrom and defines a path of crop residue discharged in the rear end, the deflector plate being pivotable through a range of positions including a first position extending between the open rear end and the inlet opening of the chopper for directing the crop residue into the inlet opening, a second position extending to adjacent to a forward end of the chopper for directing the crop residue downwardly and forwardly past the chopper, and a third position extending rearwardly spaced above the chopper for directing the crop residue beneath the deflector plate and over the inlet opening outwardly from the rear end of the harvester.

5. The deflector plate of claim 4, comprising a forwardly facing concave shape surface oriented when the deflector plate is in the second position for directing the crop residue forwardly of the chopper.

6. The deflector plate of claim 4, wherein the harvester further comprises a spreader disposed in the rear end thereof forwardly of the chopper in a position for receiving chaff discharged in the rear end, the deflector plate being oriented when in the second position for directing the crop residue into the spreader.

7. The deflector plate of claim 4, wherein when in the third position, the lower portion thereof extends outwardly from the rear end of the harvester.

8. A combine harvester comprising:

a rear end into which crop residue is discharged, a rearwardly facing rear opening, an upper surface enclosing an upper region of the rear end forwardly of the rear opening and a crop residue chopper disposed in a lower region of the rear end generally beneath the rear opening, the chopper including an upwardly facing inlet opening for receiving crop residue into the chopper therethrough; and a deflector plate having an upper end pivotally mounted in the rear end adjacent to the upper surface such that the deflector plate extends downwardly therefrom, the deflector plate having a sufficient downward extent and being pivotally movable through a range of pivotal positions including a first position extending downwardly in closing relation to the rear opening to adjacent to a rear end of the inlet opening of the chopper for directing the crop residue downwardly into the inlet opening, a second position extending downwardly and forwardly of the inlet opening of the chopper for directing the crop residue downwardly and forwardly thereof, and a third position extending toward the rear opening for directing the crop residue over the inlet opening of the chopper and through the rear opening.

9. The combine harvester of claim 8, wherein the deflector plate includes a forwardly facing, generally concave surface positioned for directing the crop residue downwardly and forwardly of the chopper when in the second position.

10. The combine harvester of claim 8, further comprising a chaff spreader disposed in a bottom opening of the rear end forwardly of the chopper, the spreader being positionable for receiving at least a portion of the crop residue directed downwardly and forwardly of the chopper by the deflector plate when in the second position, the spreader being alternatively positionable to allow passage of the crop residue downwardly through the bottom opening.

* * * * *